(12) United States Patent
Ham et al.

(10) Patent No.: US 7,776,952 B2
(45) Date of Patent: Aug. 17, 2010

(54) POLYMERIC DISPERSANT HAVING AN AFFINITY WITH A SUPERCRITICAL FLUID

(75) Inventors: Cheol Ham, Yongin-si (KR); Seung-min Ryu, Yongin-si (KR); Hee-jung Roh, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1073 days.

(21) Appl. No.: 11/333,239

(22) Filed: Jan. 18, 2006

(65) Prior Publication Data

US 2006/0160946 A1     Jul. 20, 2006

(30) Foreign Application Priority Data

Jan. 18, 2005   (KR) .................. 10-2005-000444

(51) Int. Cl.
  *A61K 9/16*     (2006.01)
  *B01F 3/00*     (2006.01)
  *C08L 53/00*    (2006.01)

(52) U.S. Cl. ................ 524/543; 516/9; 525/88

(58) Field of Classification Search ......... 524/543; 516/9; 525/88
  See application file for complete search history.

(56) References Cited

U.S. PATENT DOCUMENTS

| 5,057,576 | A | * | 10/1991 | Spinelli ................ 525/267 |
| 5,780,565 | A | | 7/1998 | Clough et al. |
| 6,235,701 | B1 | | 5/2001 | Senger Elsbernd |
| 6,695,980 | B2 | | 2/2004 | Irvin et al. |
| 2002/0016424 | A1 | * | 2/2002 | King et al. ............... 526/139 |
| 2003/0121447 | A1 | | 7/2003 | Irvin et al. |

FOREIGN PATENT DOCUMENTS

JP     4-332761     11/1992

* cited by examiner

*Primary Examiner*—David Wu
*Assistant Examiner*—Michael M Bernshteyn
(74) *Attorney, Agent, or Firm*—Roylance, Abrams, Berdo & Goodman, L.L.P.

(57) ABSTRACT

A polymeric dispersant having an affinity with a supercritical fluid is provided, in which a substituent having an affinity with a supercritical fluid is attached to the terminal end of a block copolymer. The polymeric dispersant can disperse a dispersoid to particulate size by lowering surface tension between the dispersoid and the supercritical fluid to promote diffusion of the supercritical fluid into the dispersoid.

13 Claims, No Drawings

POLYMERIC DISPERSANT HAVING AN AFFINITY WITH A SUPERCRITICAL FLUID

CROSS-REFERENCE TO RELATED PATENT APPLICATION

This application claims the benefit of Korean Patent Application No. 10-2005-0004444, filed on Jan. 18, 2005, in the Korean Intellectual Property Office, the disclosure of which is incorporated by reference herein in its entirety.

BACKGROUND OF THE INVENTION

1. Field of the Invention

The present invention relates to a polymeric dispersant having an affinity with a supercritical fluid, a dispersion composition comprising the polymeric dispersant, and a method of dispersing a dispersoid using the dispersion composition. More particularly, the present invention relates to a polymeric dispersant that can disperse a dispersoid in the scale of nano-particles and maintain the dispersoid in a dispersed stable state by incorporating a compound having an affinity with a supercritical fluid into a polymeric dispersant such that the supercritical fluid more easily penetrates the openings in the dispersoid. The invention is also directed to a dispersion composition comprising the polymeric dispersant and to a method of dispersing a dispersoid by using the dispersion composition.

2. Description of the Related Art

The importance of nano-scale materials is increasing in various arts since the materials show very different properties compared to the same material having a large particle size.

An organic pigment among nano-scale particles is used for various purposes, such as ink, coating, toner, plastic, rubber, film and displays since they have excellent stability against heat and chemicals.

The chemical or physical properties of the organic pigment's nano particles depend on the shape of particles or crystals, the molecular orientation, the sizes and distribution, and the surface properties of the particles. The organic pigment's nano particles usually have diameters in the range of 10 to 50 nm, and can be easily aggregated into large particles due to their high surface energy.

Meanwhile, although a roll mill or a medium disperser, etc. has been previously used in order to disperse a solid-based dispersoid used as raw material for paint, ink, ceramic, cosmetics and food, etc., such apparatuses have long working times, and washing the apparatuses after working is cumbersome. The particles obtained by milling have a wide or broad particle distribution since the apparatuses generally impart mechanical shear force to the dispersoid particles to make the particulates.

Furthermore, dispersions employing fluid energy require high pressure compressed air and is effective for hard and fragile material. However, this process is less effective for soft particles.

To solve the problems described above, U.S. Pat. No. 5,921,478 suggests a method of minutely dispersing a dispersoid by mixing a solvent and a dispersoid, mixing a supercritical solvent therewith, allowing the supercritical solvent to be in a supercritical state through heating and compressing, and then reducing the pressure to atmospheric pressure.

The method disperses solid particles efficiently using the properties of a supercritical fluid that can change density quickly from that of gaseous state to that of liquid state by changing pressure and temperature.

Pure material is present in the state of gas, liquid or solid depending on pressure and temperature. The phase-change line between liquid-gas has a critical value of maximum temperature and pressure that the state of the liquid and the gas coexist at equilibrium condition. The gas and liquid have the same density above the critical value, and show single phase. Thus, a fluid, where gas phase and liquid phase coexist, refers to supercritical fluid where the temperature and pressure of the fluid are at above critical value.

The supercritical fluid has the same density and solubility as in a liquid state, and the same properties in diffusion or viscosity as in a gaseous state. Further, the supercritical fluid has low surface tension, more quickly penetrates than a liquid, and has solubility that is not present in a gaseous state.

A method of dispersing using the supercritical fluid is explained in more detail as follows. Firstly, a mixture of a dispersoid and a solvent is provided to a supercritical vessel, and a supercritical solvent is provided thereto. The supercritical solvent is converted from gaseous state to a supercritical fluid by heating and compressing, and the mixture and the supercritical fluid are mixed in the supercritical vessel. The supercritical fluid infiltrates into minute gaps of particles where the dispersoid are porous particles, and into the gap between the dispersoid particles. When high pressure of the vessel containing the supercritical fluid is drastically decreased, large pressure difference between the inside of the particles and inside the vessel occurs. The supercritical fluid that had been absorbed within particles induce high inner pressure within particles, and thus when outer pressure is drastically reduced, the supercritical fluid expands quickly. Finally, the dispersoid is ruptured to disperse in the scale of one micron or less.

The supercritical fluid is prone to getting wet in particulates and is quickly diffused into agglomerates of particulates since the fluid has a high diffusion coefficient over such a liquid solvent as water or alcohol, and has a low surface tension. Furthermore, the agglomerates of particulates are separated into individual particles to make primary particles. The dispersion of particulates is promoted since the interaction between the particulate and the supercritical fluid is greater than that between the particulates.

The supercritical fluid described above is a gas vaporized at room temperature, and includes carbon dioxide, nitrous oxide, ammonia, xenon, ethane, ethylene, propane, propylene, butane, isobutane, chlorotrifluoromethane, monofluoromethane, sulfur hexafluoride and mixtures thereof. Of these, carbon dioxide may be particularly preferred since it is less reactive, nontoxic and liquefiable at proper temperature.

One of the limitations in dispersions employing the supercritical fluid is the solubility of the supercritical fluid. That is, a nonpolar fluid such as carbon dioxide has low solubility over polar material. Accordingly, if the dispersoid is polar, the dispersion employing the supercritical fluid is not sufficiently produced. In other words, since the surface of the dispersoid particles is soaked or wetted with a solvent, the supercritical fluid cannot infiltrate easily into minute gaps of the particles. Thus, the impregnation of the supercritical fluid is largely performed by only molecular diffusion in a solvent, and even though a supercritical state is reached, the supercritical fluid cannot easily influence the gaps in the agglomerates of the dispersoid particles.

Further, the dispersoid particulates dispersed by employing the supercritical fluid may be reaggregated thereby deteriorating the dispersed state.

To solve the problems described above, a dispersant is further added to a system comprising a dispersoid, a solvent and a supercritical fluid. However, a general polymeric dis-

SUMMARY OF THE INVENTION

Thus, the first technical subject to be sought by the present invention is to provide a polymeric dispersant that has high affinity with a supercritical fluid in a dispersion employing a supercritical fluid such that the supercritical fluid sufficiently soaks or penetrates into the openings of the dispersoid.

The second technical subject to be sought by the present invention is to provide a dispersion composition comprising the polymeric dispersant.

The third technical subject to be sought by the present invention is to provide a method of dispersing a dispersoid by employing the polymeric dispersant.

The present invention provides a polymeric dispersant in which a halocarbon compound or a silicon compound is bound to one terminal end of a block copolymer chain of the dispersant.

According to an embodiment of the present invention, the halocarbon compound or the silicon compound can be attached in the amount of 1 to 50 parts by weight based on 100 parts by weight of total dispersant.

According to another embodiment of the present invention, the halocarbon compound may be pentafluorobenzyl bromide, 2,3,5,6-tetrafluoro-4-(trifluoromethyl)benzyl bromide, 3,5-bis(trifluoromethyl)benzyl bromide, decafluorobenzhydryl bromide, 2-(perfluorooctyl)ethyl isocyanate, and pentafluorophenyl isocyanate, etc.

According to still another embodiment of the present invention, the silicon compound may be a chlorine-terminated poly(dimethylsiloxane), or a glycidylether-terminated poly(dimethylsiloxane), etc.

The present invention also provides a dispersion composition comprising pigment particles and the dispersant.

The present invention also provides a method of dispersing a dispersoid including providing to a vessel a mixture of a dispersoid, a solvent and a polymeric dispersant in which a halocarbon compound or a silicon compound is bound to one terminal end of a block copolymer chain; adding a supercritical solvent to the vessel; heating and compressing the supercritical solvent to convert into a supercritical fluid; mixing the mixture and the supercritical fluid to obtain a supercritical mixture; and discharging the supercritical mixture under atmospheric pressure.

The polymer dispersant according to the present invention can disperse a dispersoid to nano-size particles and form a stable dispersion by lowering the surface tension between the dispersoid and the supercritical fluid to promote diffusion of the supercritical fluid into the dispersoid.

DETAILED DESCRIPTION OF THE INVENTION

The present invention will now be described more fully hereinafter with reference to the preferred embodiments of the invention. This invention may, however, be embodied in many different forms and should not be construed as being limited to the embodiments set forth herein. Rather, these embodiments are provided so that this disclosure is thorough and complete, and fully conveys the scope of the invention to those skilled in the art.

The block copolymeric dispersant according to the present invention is characterized in that a halocarbon compound or a silicon compound is bound to one terminal end of a polymeric chain of the copolymer.

The polymeric dispersant in which a halocarbon compound or a silicon compound is bound consists of a part adsorbed on a surface of a pigment and a part providing steric stabilization. The hydrophilic monomer forming the stabilization part that is an electrolyte in an aqueous medium and may include at least one selected from the group consisting of acrylic acid, acrylate, methacrylic acid, methacrylate, maleic anhydride and sodium styrene sulfonate. Of these, methacrylate is particularly preferred, but it is not limited to these examples.

Further, the monomer constituting the hydrophobic part of a dispersant used in an aqueous medium, and the polar or nonpolar part of a dispersant used in an organic solvent includes, but is not limited to, methyl methacrylate, butyl methacrylate, lauryl methacrylate, ethyl acrylate, butyl acrylate, arylonitrile, methacrylonitrile, 2-ethylhexyl methacrylate, 3,3-dimethoxypropyl acrylate, 3-methacryloxypropyl acrylate, 2-acetoxyethyl methacrylate, p-tolyl methacrylate, 2,2,3,3,4,4,4-heptafluorobutyl acrylate, ethyl 2-cyanoacrylate, N,N-dimethylacrylamide, 4-fluorophenyl acrylate, 2-methacryloxyethyl acrylate, propyl vinyl ketone, ethyl 2-chloro acrylate, glycidyl methacrylate, 3-methoxypropyl methacrylate, phenyl acrylate, 2-(trimethylsiloxy)ethyl methacrylate, 2-(methylsiloxy)ethyl methacrylate, allyl acrylate, allyl methacrylate, ethyleneglycol diacrylate, diethyleneglycol diacrylate, glycerol diacrylate, glyceryl triacrylate, ethyleneglycol dimethacrylate and hexamethylene diol diacrylate.

The halocarbon compound bound to one terminal end of the block copolymer chain in the polymeric dispersant according to the present invention may be pentafluorobenzyl bromide, 2,3,5,6-tetrafluoro-4-(trifluoromethyl)benzyl bromide, 3,5-bis(trifluoromethyl)benzyl bromide, decafluorobenzhydryl bromide, 2-(perfluorooctyl)ethyl isocyanate, and pentafluorophenyl isocyanate, etc. The silicon compound bound to one terminal end of the block copolymer chain may be chlorine-terminated poly(dimethylsiloxane), or glycidylether-terminated poly(dimethylsiloxane), etc.

The halocarbon compound or the silicon compound can be bound to the polymeric chain in the amount of 1 to 50 parts by weight based on 100 parts by weight of total dispersant. When the amount is less than 1 part by weight, the affinity effect for the supercritical fluid by a substituent group cannot be obtained. When the amount exceeds 50 parts by weight, the solubility and dispersion stability to the dispersion solvent are decreased.

The polymeric dispersant according to the present invention is especially effective for a nonpolar supercritical fluid, which can be at least one selected from the group consisting of carbon dioxide, nitrous oxide, xenon, ethane, ethylene, propane, propylene, butane, isobutene, chlorotrifluoromethane, and sulfur hexafluoride.

The polymeric dispersant according to the present invention acts effectively in a solvent/supercritical fluid dispersion system since a halocarbon compound or a silicon compound is bound to a terminal end of the polymer chain of the dispersant. The dispersant functions as a dispersant in dispersing a dispersoid in a supercritical fluid where the dispersoid has no affinity with various supercritical fluids since the dispersant has high affinity with a supercritical fluid, i.e., surfactant activity. That is, the dispersant allows the supercritical fluid to be dispersed to smaller particles having a narrow particle size distribution by promoting diffusion into a dispersoid predispersed in a solvent and a dispersant.

Herein, the supercritical fluid is infiltrated into the dispersoid particles on which a dispersant is adsorbed while surrounding the particles. Thus, the supercritical fluid is present in the form of an emulsion in a dispersion solvent, and the particles are positioned in the emulsion.

A substituent having an affinity with a supercritical fluid can be designed in consideration of the constitution of a dispersion, most importantly the properties of a dispersoid. Also, for efficiency of dispersion and maximizing long-term storage stability, at least two substituents having an affinity with a supercritical fluid can be bound to the polymer chain. In another embodiment, at least two dispersants can be used simultaneously where the dispersants can have different substituents bonded to the terminal end of the polymer chain.

The number average (Mn) molecular weight of the dispersant according to the present invention may be 300,000 or less, or 200,000 or less. The number average molecular weight may be further 150,000 or less, and may be in the range of 300 through 120,000. The design and synthesis of the dispersant are achieved so that a stable colloid dispersion product of a dispersoid/dispersant composite having diameters of less than 500 nm, preferably less than 300 nm, and more preferably 100 through 250 nm can be formed.

According to the present invention, a dispersoid is dispersed in a solvent by a method comprising operations of providing to a vessel a mixture of a dispersoid, a solvent and a polymeric dispersant in which a halocarbon compound or a silicon compound is bound to one terminal end of a block copolymer chain; adding a supercritical solvent to the vessel; heating and compressing the supercritical solvent to be converted into a supercritical fluid; mixing the mixture and the supercritical fluid to give a supercritical mixture; and discharging the supercritical mixture under atmospheric pressure.

The dispersoid is a solid-based particulate that is dispersed in a liquid-based solvent. The solid-based particulate includes a superparticulate such as a pigment, a ceramic material powder and a magnetic particle, etc.

The liquid-based solvent includes water and an organic solvent that form a continuous phase.

The dispersant according to the present invention may be in the amount of 0.1 to 70 parts by weight based on 100 parts by weight of the dispersoid. If the amount is less than 0.1 parts by weight, the desired dispersing effect cannot be sufficiently obtained. If the amount exceeds 70 parts by weight, the viscosity increases which decreases the dispersing effect.

In the method according to the present invention, a mixture of a dispersoid, a solvent and a polymeric dispersant according to the present invention is first provided to a supercritical vessel. The dispersoid is in a state where many particles form aggregates, so that particles are aggregated when the dispersoid is first added to the vessel. The mixture in the suspended state can be predispersed, or be provided to the supercritical vessel immediately without predispersing depending on the properties of the dispersoid.

Next, the supercritical vessel is filled with a supercritical solvent. The supercritical solvent is heated and compressed by heating and compressing means, for example, a heater and a pump, thereby producing the supercritical fluid. The supercritical fluid obtained in this manner has a higher diffusion coefficient and lower surface tension than those of a liquid solvent such as water or alcohol so that it is well soaked and permeated into the particulate aggregates. Further, the particulate aggregates are pulverized to form primary particles, and thus, the dispersion of the particulates is promoted since the interaction between the dispersoid particulate and the supercritical fluid is greater than that between the dispersoid particulates.

Then, in order to promote forming the primary particles and impregnating into particles or pores of the particles, the mixture and the supercritical fluid are mixed to obtain a supercritical mixture. The dispersion in which the dispersoid is dispersed in nano scale is obtained by discharging the supercritical mixture from the supercritical vessel under atmospheric pressure to expand and swell the supercritical fluid within the particles.

Further, according to the present invention, a dispersion composition containing pigment particles; and the dispersant described above is provided. The dispersion composition according to the present invention can be used in preparing an ink for an ink jet printer and other printer.

The dispersion composition according to the present invention can comprise additives in addition to pigment particles and the dispersant.

The pigment that can be used in the dispersion composition can include both an organic pigment and an inorganic pigment. The pigments include, but are not limited to, black, cyan, yellow, magenta, red, blue and white pigments. A representative black pigment is a carbon black. The choice of a carbon black suitable for use in the present invention depends largely on the degree of oxidation of the surface and the degree of black of the pigment. An acidic or surface treated pigment provides an interaction site suitable for strong adsorption of a dispersant. The pigment with high degree of black provides printed images having high quality.

The stability of the dispersed pigment particles can be reinforced, particularly at high temperatures if the attraction between the dispersant and pigment particles is stronger than the attraction between the pigment particles.

The amount of the pigment particles may be 0.1 to 20 parts by weight, especially 0.5 to 15 parts by weight, based on 100 parts by weight of the dispersion composition. If the amount is less than 0.1 parts by weight, it is not proper for use in an ink and a coating. If the amount exceeds 20 parts by weight, it is difficult to obtain the desired dispersion effect.

The dispersion composition according to the present invention can further comprise optionally additives such as a viscosity controller, a surfactant and metal oxide additives.

The surfactant controls the surface tension of the dispersion composition to stabilize jetting at a nozzle. The surfactant performing such function includes an ionic surfactant and a nonionic surfactant.

The amount of the surfactant is generally included in an amount of 0.1 to 5.0 parts by weight based on 100 parts by weight of the dispersion composition. If the amount is less than 0.1 parts by weight, it is difficult to obtain the surfactant effects. If the amount exceeds 5.0 parts by weight, it is not suitable for various uses due to inordinate decrease of its surface tension.

The viscosity controller controls viscosity to maintain smooth jetting. A suitable viscosity controller is selected from the group consisting of polyvinyl alcohol, casein, carboxymethyl cellulose is used. The amount of the viscosity controller may be 0.1 to 5.0 parts by weight based on 100 parts by weight of the dispersion composition. If the amount is less than 0.1 parts by weight, it is difficult to obtain the viscosity control effect. If the amount exceeds 5.0 parts by weight, it is not suitable for various uses due to inordinate increase in viscosity.

The present invention will be described in greater detail with reference to the following examples. The following examples are for illustrative purposes and are not intended to limit the scope of the invention.

All the materials used in the examples are those available at Aldrich Chemical Company in Milwaukee, Wis., United States unless specified otherwise.

Meanwhile, the use of the dispersed product according to the present invention is not particularly limited and the dispersed product can be used in a toner composition, various paints and a coating liquid, in addition to an ink composition.

PREPARATION EXAMPLES

Synthesis of a Dispersant

Preparation Example 1

MAA/BMA//BMA—Pentafluorobenzyl Block Copolymer (Dispersant A)

10 ml of THF and 7.8 ml of dimethylketene methyltrimethylsilylacetal initiator were mixed under argon gas atmosphere, and stirred for 30 minutes. 1.1 g of tetrabutylammonium m-chlorobenzene were added as a catalyst to 2 ml of acetonitrile to dissolve and the mixture stirred for 2 hours. 46.4 ml of trimethylsilyl methacrylate dissolved in 20 ml of THF and 5.1 ml of butyl methacrylate were added dropwise. After reacting the solution for 2 hours, 11.2 ml of butyl methacrylate dissolved in 6 ml of THF were added slowly. After reacting the solution for 3 hours, 9.1 g of pentafluorobenzyl bromide were added to substitute the terminal end of a hydrophobic part of the resulting polymer. After stirring the solution for 10 hours, 120 ml of methanol were added, the solution was refluxed with heating for 4 hours, and then the solvent was removed under reduced pressure. The resultant solid was completely dissolved in 200 ml of 3N NaOH aqueous solution, the solution was filtered with a filter paper, and then 100 ml of HCl aqueous solution were added. The resulting precipitate was filtered and washed, and then dried in a vacuum oven for 24 hours to give MAA/BMA//BMA—pentafluorobenzyl block copolymer powders.

Through GC analysis, it was confirmed whether the monomers were exhausted and polymerized. Through GPC, the molecular weight and its distribution were determined, and through NMR structural analysis, it was confirmed whether the dispersant to which pentafluorobenzyl is bound was synthesized.

Preparation Example 2

MAA/BMA//BMA—(Perfluorooctyl) Ethyl Block Copolymer (Dispersant B)

Dispersant B was prepared according to the same method as in the Preparation Example 1 except that 18.6 g of 2-(perfluorooctyl)ethyl isocyanate were used instead of pentafluorobenzyl bromide, and the results were confirmed.

Preparation Example 3

MAA/BMA//BMA—Bis(trifluoromethyl)Benzyl Block Copolymer (Dispersant C)

Dispersant C was prepared according to the same method as in the Preparation Example 1 except that 17.3 g of 3,5-bis(trifluoromethyl)benzyl bromide were used instead of pentafluorobenzyl bromide, and the results were confirmed.

Preparation Example 4

BMA/MMA//t-BAEMA—Poly(dimethylsiloxane) Block Copolymer (Dispersant D)

7 ml of THF and 12.6 ml of dimethylketene methyltrimethylsilylacetal initiator were mixed under argon gas atmosphere, and stirred for 30 minutes. 0.51 g of tetrabutylammonium m-chlorobenzene were added as a catalyst to 1 ml of acetonitrile to dissolve and the mixture stirred for 2 hours. 23.4 ml of butyl methacrylate dissolved in 15 ml of THF, and 15.7 ml of methyl methacrylate were added dropwise. After reacting the solution for 2 hours, 18.7 ml of t-butyl aminoethyl methacrylate (t-BAEMA) dissolved in 6 ml of THF were added slowly. After reacting the solution for 3 hours, 12.6 g of glycidyl ether terminated poly(dimethylsiloxane) (Mn ~980) were added to substitute the terminal end of a polar part. After stirring the solution for 10 hours, 120 ml of methanol were added, the solution was refluxed with heating for 4 hours, and then the solvent was removed under reduced pressure. The resulting product was dried in a vacuum oven for 24 hours to give BMA/MMA//t-BAEMA—poly(dimethylsiloxane) block copolymer powders.

Through GC analysis, it was confirmed whether the monomers were exhausted and polymerized. Through GPC, the molecular weight and its distribution were determined, and through NMR structural analysis, it was confirmed whether the dispersant to which poly(dimethylsiloxane) is bound was synthesized.

Preparation Example 5

BMA/MMA//t-BAEMA—Pentafluorophenyl Block Copolymer (Dispersant E)

Dispersant E was prepared according to the same method as in the Preparation Example 4 except that 12.6 g of pentafluorophenyl isocyanate were used instead of glycidyl terminated poly(dimethylsiloxane), and the results were confirmed.

The molecular weight and polydispersity of the block copolymers obtained from the Preparation Examples 1 to 5 are shown in table 1 below.

TABLE 1

| Dispersant | Mn | Mw | PDI |
|---|---|---|---|
| A | 4,864 | 5,891 | 1.21 |
| B | 5,054 | 5,861 | 1.16 |
| C | 5,164 | 6,164 | 1.19 |
| D | 6,240 | 8,112 | 1.30 |
| E | 5,451 | 7,250 | 1.33 |

In the Table 1, Mn is number average molecular weight, Mw is weight average molecular weight, and PDI is polydispersity.

Example 1

10 g of Red A3B (Pigment Red 177, Ciba-Geigy Co.) pigment were added to 100 g of an aqueous solution containing 3% by weight of Dispersant A and the solution was stirred, and then placed in a supercritical vessel. Liquid $CO_2$ was added thereto. After maintaining a supercritical state for 20 minutes by controlling the condition from 25° C., 1 atm to 55° C., 100 atm, the aqueous dispersion solution was discharged into a collecting bath under atmospheric pressure together with $CO_2$ to give a dispersion of the pigment.

Example 2

11 g of B6700 (Pigment Blue 15:6, BASF) pigment were added to 100 g of an aqueous solution containing 3% by weight of Dispersant B and the solution was stirred, and then placed in a supercritical vessel. Liquid $CO_2$ was added thereto. After maintaining a supercritical state for 20 minutes by controlling the conditions from 25° C., 1 atm to 55° C., 100 atm, the aqueous dispersion solution was discharged into a collecting bath under atmospheric pressure together with $CO_2$ to give a dispersion of the pigment.

Example 3

7.5 g of carbon black 5000 ii (Columbian Chemicals) pigment were added to 100 g of an aqueous solution containing 3% by weight of Dispersant C and the solution was stirred, and then placed in a supercritical vessel. Liquid $CO_2$ was added thereto. After maintaining a supercritical state for 20 minutes by controlling the conditions from 25° C., 1 atm to 55° C., 100 atm, aqueous dispersion solution was discharged into a collecting bath under atmospheric pressure together with $CO_2$ to give a dispersion of the pigment.

Example 4

14 g of Quinacridone magenta (rt-143-d, Ciba-Geigy Co.) pigment were added to 10 g of n-paraffin solution containing 2.5% by weight of Dispersant D and the solution was stirred, and then placed in a supercritical vessel. Liquid $CO_2$ was added thereto. After maintaining a supercritical state for 20 minutes by controlling the conditions from 25° C., 1 atm to 60° C., 120 atm, the aqueous dispersion solution was discharged into a collecting bath under atmospheric pressure together with $CO_2$ to give a dispersion of the pigment.

Example 5

15 g of Phthalocyanine blue (bt-617-d, Clariant) pigment were added to 100 g of n-butyl acetate solution containing 2.5% by weight of Dispersant E and the solution was stirred, and then placed in a supercritical vessel. Liquid $CO_2$ was added thereto. After maintaining a supercritical state for 20 minutes by controlling the conditions from 25° C., 1 atm to 60° C., 120 atm, the aqueous dispersion solution was discharged into a collecting bath under atmospheric pressure together with $CO_2$ to give a dispersion of the pigment.

Comparative Example 1

A pigment dispersion was prepared according to the same method as in the Example 1 except that MAA/BMA//BMA block copolymer was used instead of Dispersant A.

Comparative Example 2

A pigment dispersion was prepared according to the same method as in the Example 4 except that BMA/MMA//t-BAEMA block copolymer was used instead of Dispersant D.

Comparative Example 3

10 g of Red A3B (Pigment Red 177, Ciba-Geigy Co.) pigment were added to 10 g of an aqueous solution containing 3% by weight of MAA/BMA//BMA block copolymer and the resultant mixture was stirred, and then pulverized with 200 g of zirconium bead (diameter of 0.5 nm) in Dispermat (Model CV) available at VMA-GETZMANN GmbH in Reichshof, Germany in the speed of 10,000 rpm. After pulverization for 100 minutes, a pigment dispersion was obtained.

Comparative Example 4

14 g of Quinacridone magenta (rt-143-d, Ciba-Geigy Co.) pigment were added to 100 g of n-paraffin solution containing 2.5% by weight of BMA/MMA//t-BAEMA block copolymer and the resultant mixture was stirred, and then pulverized with 200 g of zirconium bead (diameter of 0.5 nm) in Dispermat (Model CV) available at VMA-GETZMANN GmbH in Reichshof, Germany in the speed of 10,000 rpm. After pulverization for 100 minutes, a pigment dispersion was obtained.

To evaluate the performance of the dispersion composition prepared as above, the following tests were performed.

A dispersion composition containing a pigment dispersion was made to 5% by weight of solid concentration. The solid comprises a pigment, a surfactant and any other non-volatile additive such as an ancillary dispersant. After dispersing and filtering, the resulting composition was stored in a vitreous vial while the opening was sealed, and the vial was stored in 60° C. oven for 2 months without disturbance.

After being stored, the diameter of the pigment dispersed product in the composition was measured with a superparticulate analyser (Horiba Ltd., trademark LA-910), and was evaluated according to the reference below.
○: smaller than 250 nm
Δ: 250~500 nm
X: larger than 500 nm Further, it was evaluated with naked eye according to the reference below whether the change was occurred in dispersed state of the dispersion composition.
○: no change
Δ: agglomerate occurred
X: layer separation occurred The test results are shown in Table 2 below.

TABLE 2

| Dispersion composition | Storage stability | Dispersed state |
|---|---|---|
| Example 1 | ○ | ○ |
| Example 2 | ○ | ○ |
| Example 3 | ○ | ○ |
| Example 4 | ○ | ○ |
| Example 5 | ○ | ○ |
| Comp. example 1 | X | X |
| Comp. example 2 | X | X |
| Comp. example 3 | Δ | Δ |
| Comp. example 4 | Δ | Δ |

As can be seen in the Table 2, the dispersion composition containing the polymeric dispersant according to the present invention has a narrow size distribution of dispersed pigment particles and nano scale size, and excellent dispersion stability.

The polymeric dispersant according to the present invention disperses a dispersoid effectively by rendering a supercritical fluid to be well soaked into the dispersoid since the dispersant has excellent affinity with a supercritical fluid. Further, when the polymeric dispersant according to the present invention is used, the stability of the dispersion after being dispersed is also excellent.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A polymeric dispersant having a block copolymer chain and a silicon compound bound to a terminal end of said block copolymer chain, wherein the silicon compound is chlorine-terminated poly(dimethylsiloxane) or glycidyl ether-terminated poly(dimethylsiloxane).

2. The polymeric dispersant according to claim 1, wherein the silicon compound is bound in an amount of 1 to 50 parts by weight based on 100 parts by weight of total dispersant.

3. A dispersion composition comprising pigment particles; and the polymeric dispersant according to claim 1, wherein said silicon compound have an affinity for said pigment particles.

4. The dispersion composition of claim 3, wherein the polymeric dispersant is a copolymer obtained from a hydrophilic monomer and a hydrophobic monomer.

5. The dispersion composition of claim 4, further comprising a solvent and a supercritical fluid and where the copolymer has an affinity for the supercritical fluid.

6. The dispersion composition of claim 5, wherein said solvent comprises water and an organic solvent.

7. A polymeric dispersant having a block copolymer chain and a halocarbon compound bound to a terminal end of said block copolymer chain.

8. The polymeric dispersant according to claim 7, wherein the halocarbon compound is selected from the group consisting of pentafluorobenzyl bromide, 2,3,5,6-tetrafluoro-4-(trifluoromethyl)benzyl bromide, 3,5-bis(trifluoromethyl)benzyl bromide, decafluorobenzhydryl bromide, 2-(perfluorooctyl)ethyl isocyanate, and pentafluorophenyl isocyanate.

9. The polymeric dispersant according to claim 7, wherein the halocarbon compound is bound in an amount of 1 to 50 parts by weight based on 100 parts by weight of total dispersant.

10. A dispersion composition comprising pigment particles; and the polymeric dispersant according to claim 7, wherein said halocarbon compound has an affinity for said pigment particles.

11. The dispersion composition of claim 10, wherein the polymeric dispersant is a copolymer obtained from a hydrophilic monomer and a hydrophobic monomer.

12. The dispersion composition of claim 11, further comprising a solvent and a supercritical fluid and where the copolymer has an affinity for the supercritical fluid.

13. The dispersion composition of claim 12, wherein said solvent comprises water and an organic solvent.

* * * * *